(12) United States Patent
Walther

(10) Patent No.: US 12,348,331 B2
(45) Date of Patent: Jul. 1, 2025

(54) INTERNET-OF-THINGS MODULE

(71) Applicant: Perinet GmbH, Berlin (DE)

(72) Inventor: Karsten Walther, Königs Wusterhausen (DE)

(73) Assignee: Perinet GmbH, Berlin (DE)

( * ) Notice: Subject to any disclaimer, the term of this patent is extended or adjusted under 35 U.S.C. 154(b) by 0 days.

(21) Appl. No.: 17/765,324

(22) PCT Filed: Sep. 30, 2020

(86) PCT No.: PCT/EP2020/077345
§ 371 (c)(1),
(2) Date: Mar. 30, 2022

(87) PCT Pub. No.: WO2021/064008
PCT Pub. Date: Apr. 8, 2021

(65) Prior Publication Data
US 2022/0337450 A1 Oct. 20, 2022

(30) Foreign Application Priority Data
Sep. 30, 2019 (DE) ...................... 10 2019 126 341.7

(51) Int. Cl.
*H04L 12/40* (2006.01)
*H04L 12/10* (2006.01)
*G16Y 40/00* (2020.01)

(52) U.S. Cl.
CPC ........ *H04L 12/40045* (2013.01); *H04L 12/10* (2013.01); *G16Y 40/00* (2020.01)

(58) Field of Classification Search
CPC ........ G01D 21/00; G16Y 40/00; H04L 12/10; H04L 12/40045
See application file for complete search history.

(56) References Cited

U.S. PATENT DOCUMENTS 5,535,338 A * 7/1996 Krause ................. H04L 45/742
709/228
8,132,035 B2 3/2012 Juillerat et al.
(Continued)

FOREIGN PATENT DOCUMENTS

CN 103378975 A 10/2013
CN 104412541 A 3/2015
(Continued)

OTHER PUBLICATIONS

Ngo, Dong. "How to turn an old Wi-Fi router into an access point" CNET. https://www.cnet.com/home/internet/how-to-turn-an-old-wi-fi-router-into-an-access-point/ Jun. 30, 2016. (Year: 2016).*
(Continued)

*Primary Examiner* — Stephen J Clawson
(74) *Attorney, Agent, or Firm* — Seed IP Law Group LLP

(57) ABSTRACT

An Internet-of-Things module is provided, comprising a first interface, via which the module can be coupled to a hybrid single pair Ethernet line for exchanging data and/or commands and for supplying voltage. The module also has a voltage regulator for converting the first voltage applied at the first interface into a second voltage for supplying the module. A controller is also provided for IP-based communication via the hybrid single pair Ethernet line. A second interface is also provided, via which the module can be coupled to a sensor and/or actuator for exchanging data, signals and/or commands and for supplying voltage.

12 Claims, 4 Drawing Sheets

(56) References Cited

U.S. PATENT DOCUMENTS

| | | | | |
|---|---|---|---|---|
| 2002/0083317 | A1* | 6/2002 | Ohta | H04L 9/3236 |
| | | | | 713/161 |
| 2005/0003650 | A1* | 1/2005 | Ramanathan | H01L 24/11 |
| | | | | 257/E21.705 |
| 2007/0041387 | A1* | 2/2007 | Ghoshal | H04L 12/10 |
| | | | | 370/395.52 |
| 2008/0005600 | A1* | 1/2008 | Diab | G06F 1/3209 |
| | | | | 713/300 |
| 2012/0271477 | A1* | 10/2012 | Okubo | H04L 12/10 |
| | | | | 700/297 |
| 2018/0062967 | A1 | 3/2018 | Wewers et al. | |
| 2019/0263339 | A1 | 8/2019 | Lee | |
| 2020/0195450 | A1* | 6/2020 | Bains | G06F 13/1668 |
| 2020/0274724 | A1* | 8/2020 | Rosenthal | G06F 1/266 |
| 2022/0150996 | A1* | 5/2022 | Nishikawa | H04W 76/12 |

FOREIGN PATENT DOCUMENTS

| | | |
|---|---|---|
| DE | 10 2010 011 655 A1 | 9/2011 |
| DE | 10 2017 111 272 A1 | 3/2018 |
| DE | 10 2018 126 357 A1 | 4/2019 |
| DE | 10 2019 126 341 A1 | 4/2021 |
| DE | 10 2019 126 341 B4 | 1/2022 |
| WO | 2018/158778 A1 | 9/2018 |
| WO | WO 2019081508 A1 | 5/2019 |
| WO | 2019/183340 A1 | 9/2019 |
| WO | 2021/064008 A1 | 4/2021 |

OTHER PUBLICATIONS

"Connectors for electrical and electronic equipment—Product requirements—Part 3-125: Connectors—Type specification for 2-pole and 4-pole (data/power) shielded free and fixed connectors for data transmission and power supply with frequencies up to 600 MHz (IED 488/2600/CD:2017); Text in German and English," DIN EN 61076-3-125 (VDE 0687-76-3-125), May 9, 2018, 159 pages (with English Machine Translation).

E-mail for Matthias Bergmann, "Presentation of the GMHT Competence Days," dated May 28, 2019, 2 pages (with English Machine Translation).

Harting, "SPE—a new medium in data networking opportunities for the development of new applications in the context of IoT/IIoT," GHMT Competence Days, 2019, 61 pages (with English Machine Translation).

IEC, "Connectors for electronic equipment—Product requirements—Detail specification for 2-way, shielding and unshielded, free and fixed connectors for data transmission up to 600MHz with current carrying capacity," Project No. IEC 61076-3125 ED1, date of circulation: Oct. 6, 2017, closing date for comments: Jan. 26, 2018, 42 pages.

Kurose et al., "Computer Networking," $6^{th}$ Edition, Pearson Deutschland GmbH, 2014, 12 pages (with English Machine Translation).

Lumbergautomation, "Manual—LioN-P Ethernet/IP 10-Link Master," Version 1.1.01, 2018, 279 pages (with English Machine Translation).

Notice of Opposition, for German Patent Application No. 10 2019 126 341, dated Oct. 20, 2022, 23 pages.

Reißenweber, "Fieldbus systems for industrial communication," $2^{nd}$ edition, Oldenbourg Industrieverlag Munich, 2002, 12 pages (with English Machine Translation).

Wikipedia, "Power over Ethernet", retrieved on Oct. 20, 2022, 14 pages (with English Machine Translation).

Brandt, "Industrial Automation and Emerging Single-Pair Ethernet," presentation, 10Mbps Single-Pair Ethernet Study Group, Institute of Electrical and Electronics Engineers 802.3 Sep. 2016 Interim Meeting, Fort Worth, TX, 17 pages.

Lumbergautomation, "Manual—LioN-P Ethernet/IP 10-Link Master," Version 1.0, Apr. 2017, 117 pages.

GHMT Competence Days, "THfi T Ifompetence Days 2019,"URL=https://www.glwnt.de/index.php?id=24., download date Aug. 24, 2023, 4 pages. (with English machine translation).

Lumberg Automation Support Center, "Manual-10-EtherNetIP-LioN P-IO-LinkENV1.0 BuildD0O7-2017.pdf", download date Aug. 24, 2023, 2 pages. (with English machine translation).

Notice of Opposition, for German Patent Application No. 10 2019 126 341, mailed May 5, 2023, 18 pages. (with English machine translation).

English Translation of Chinese Office Action for Chinese Application No. 202080068713.5, dated Mar. 28, 2024, 9 pages.

Wikipedia, System-on-a-Chip [with Machine Translation], retrieved on Jun. 12, 2024, from URL=https://de.wikipedia.org/w/index.php?title=System-on-a-Chip&oldid=1. (18 pages).

Wikipedia, System on module, retrieved Jun. 12, 2024, from URL=https://en.wikipedia.org/w/index.php?title=System_on_module&oldid. (2 pages).

Wikipedia, System in a package, retrieved on Jun. 28, 2024, from URL=https://en.wikipedia.org/w/index.php?title=System in a package&old. (3 pages).

International Electrotechnical Commission, "Multicore and symmetrical pair/quad cables for digital communications—Part 11: Symmetrical single pair cables with transmission characteristics up to 1,25 GHz—Horizontal floor wiring—Sectional specification", *International Standard*, IEC 61156-11, May 2019. (28 pages).

\* cited by examiner

INTERNET-OF-THINGS MODULE

BACKGROUND

Technical Field

The present invention relates to an Internet-of-Things module.

Description of the Related Art

In the field of Internet-of-Things (IoT), sensors and/or actuators are typically connected via cables to a network to allow communication. For example, communication with the sensors and/or actuators can be based on an IP (internet protocol). Up to now it has been customary to implement communication indirectly via gateways (converters). The communication between the network and the gateway is then typically IP-based communication, while the communication between the gateway and the sensor or actuator is not based on an IP protocol.

On the other hand, sensors and/or actuators are known which enable wireless communication (e.g., WLAN, 4G, 5G, etc.) with a network so that IP-based communication can be implemented.

If the sensors and/or actuators must be wired into the network, this can be accomplished, for example, using an Ethernet protocol with multiple-pair Ethernet cables. The sensors and/or actuators can be supplied with power via a "Power over Ethernet" system.

In the German patent application giving rise to a right of priority, the German Patent and Trademark Office has examined the following documents: WO 2018/158 778 A1, WO 2019/183 340 A1, US 2019/0263 339 A1 and DE 10 2017 111 272 A1.

BRIEF SUMMARY

Provided is an Internet-of-Things module that enables improved and more cost-effective communication between a network and a device, such as a sensor and/or actuator.

Thus, an Internet-of-Things module comprising a first interface and a second interface is provided. Via the first interface, the module can be coupled to a hybrid single pair Ethernet line for exchanging data and/or commands and for supplying voltage. The Internet-of-Things module also has a voltage regulator for converting the first voltage applied at the first interface into a second voltage for supplying the module. A controller is also provided for IP-based communication via the hybrid single pair Ethernet line that can be coupled to the first interface. Using the second interface, the module can be coupled to a device for exchanging data, signals and/or commands and for supplying voltage.

According to one aspect of the present invention, the device that can be coupled to the second interface is a sensor, actuator, a wireless transmitter/receiver, and/or an input/output adapter.

The invention is based on the idea of using a hybrid single pair Ethernet architecture to transfer both data and power to a device, such as the sensor, actuator and/or a wireless client. A hybrid single pair Ethernet line has two separate pairs of conductors, one for transmitting data and one for transmitting power. By means of the module, which is provided between the device (a sensor, actuator and/or wireless transmitter/receiver (client)), communication between a network and the device can take place based on an IP protocol. This enables the devices (sensors/actuators) to communicate directly with the network without the need for an intermediate converter or gateway. The communication between the module and the network is therefore IP-based.

The module has a first interface via which the module is connected to a single pair Ethernet cable and can receive and send data as well as be supplied with energy.

The module has a second interface for communication with the device (sensor/actuator and/or wireless client). The module has a voltage regulator for adjusting the required voltage, and a controller that allows IP-based communication via the first interface. The module has a second interface via which it can be coupled to a device to transmit data, signals and/or commands and to supply power to the device. Using the controller, IP-based communication with the network takes place via hybrid single pair Ethernet cables. This is advantageous because it allows an already well-known transmission protocol (the IP transmission protocol) to be used for the communication between the device and the network. This allows common and widely available software libraries to be used for the communication.

The device which can be coupled to the second interface of the Internet-of-Things module has neither a keyboard nor a display nor any other interfaces for configuration by the user. A web-based user interface can be provided for setting the parameters of the device. The device optionally has a single interface only for communicating with a network.

According to one aspect of the present invention, a device connected to the second interface of the Internet-of-Things module is supplied with data, signals and commands via the hybrid single pair Ethernet line which is connected to the first interface. The voltage supply is also regulated via this interface. This means that the device does not require a separate voltage supply. In addition, there is no need for optional voltage conversion in the device, as the corresponding voltage is already applied to the second interface of the Internet-of-Things module.

According to one aspect of the present invention, the device connected to the Internet-of-Things module only needs one interface for communication with a network and for supplying voltage. This means the device can have a simpler and more cost-effective design.

According to one aspect of the present invention, the device can be designed in particular as a sensor, an actuator, a wireless transmitter/receiver, or as an input/output adapter. Thus, for example, a simple sensor or actuator can be connected to a network without great effort and without modifying the sensor or actuator and be simultaneously supplied with voltage.

According to one aspect of the present invention, the device is a wireless transmitter/receiver. For example, the wireless transmitter/receiver can be configured as a WiFi client, in particular a WiFi client bridge, with integrated antenna and electronics. The wireless transmitter/receiver can communicate wirelessly according to the IEEE-802.11 standard.

Alternatively, the wireless transmitter/receiver can also perform IP-based communication with a network based on a Bluetooth protocol. Alternatively, the wireless transceiver can also perform IP-based communication with a network based on a mobile radio protocol such as LTE or 5G.

Further embodiments of the invention are the subject matter of the dependent claims.

BRIEF DESCRIPTION OF THE SEVERAL VIEWS OF THE DRAWINGS

Advantages and exemplary embodiments of the invention are elucidated below with reference to the drawing.

DETAILED DESCRIPTION

The invention relates to an Internet-of-Things IoT infrastructure in which a plurality of devices such as sensors, actuators and/or wireless clients can communicate with other components via a network (internet). The communication of the IoT modules with a network is based on an IP protocol. The devices are coupled via hybrid single pair Ethernet SPE lines, via which data and commands are exchanged and a power supply is provided. Each device is assigned an Internet-of-Things module, which forms an interface between the device and the single pair Ethernet SPE lines.

The devices that are coupled to a network via a single pair Ethernet SPE line are, for example, IoT sensors, actuators, wireless transmitters/receivers, wireless clients, or input-output adapters. The wireless clients can be WiFi clients, Bluetooth clients, ZigBee clients, DECT clients, UMTS clients, LTE clients, 5G clients, etc. An input-output adapter is used to connect sensors, including ones which communicate digitally such as IO-link sensors, to the network, i.e., digital sensors and/or actuators which do not have an IP interface.

Figure 1:
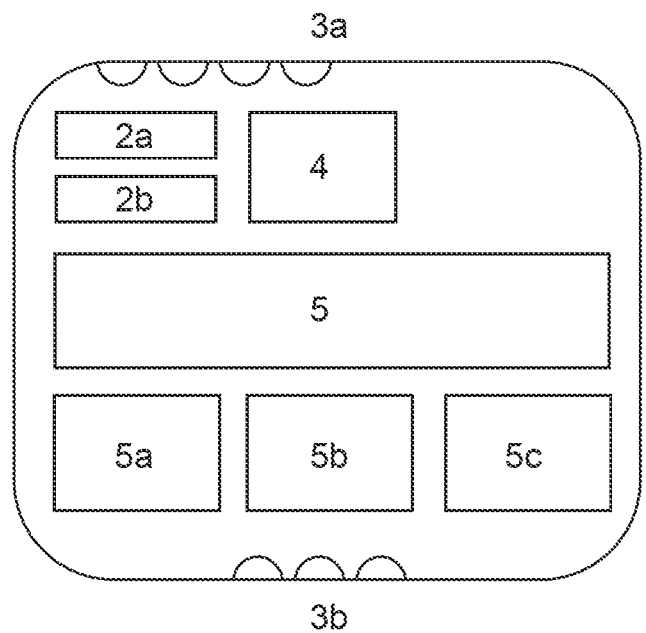
FIG. 1 shows a schematic block diagram of an Internet-of-Things module according to a first exemplary embodiment of the invention.

FIG. 1 shows a schematic block diagram of an Internet-of-Things (IoT) module according to a first exemplary embodiment of the invention. The IoT module 1 has a first interface 3*a* and a second interface 3*b*. The module 1 can be coupled to the hybrid single pair Ethernet SPE line via the first interface 3*a*. The module 1 can be coupled to a device, e.g., a sensor/actuator, via the second interface 3*b*. The module 1 can comprise a voltage regulator 4 (DC/DC converter), a controller 5, a PHY (physical layer) unit 2*a*, a MAC unit 2*b*, a memory 5*a*, a peripheral unit 5*b*, and a secure element 5*c*. The voltage regulator 4 is used to convert the DC voltage applied at the first interface into a voltage required for the operation of the module 1. The PHY unit 2*a* is used to encode/decode the T1 Ethernet signals (signals that are transmitted over the hybrid single pair Ethernet line) and provides an Ethernet-specific media-independent interface on the host side. The PHY unit 2*a* converts the data to and from the controller, which is received or transmitted via the hybrid single pair Ethernet line.

The MAC unit 2*b* is a media access control unit and is used for IP-based communication over the hybrid single pair Ethernet SPE line.

The secure element 5*c* provides secure IP-based communication via the hybrid single pair Ethernet line.

The T1 Ethernet protocol is based on the IEEE 802.3bw standard and enables transmission via single pair Ethernet cables based on the IP protocol. The T1 Ethernet protocol allows, for example, 100BASE-T1 Ethernet communication.

The peripheral unit 5*b* is used for access to the device, e.g., the sensor/actuator signals by the controller, for example in the form of an analogue-digital converter.

Figure 2:
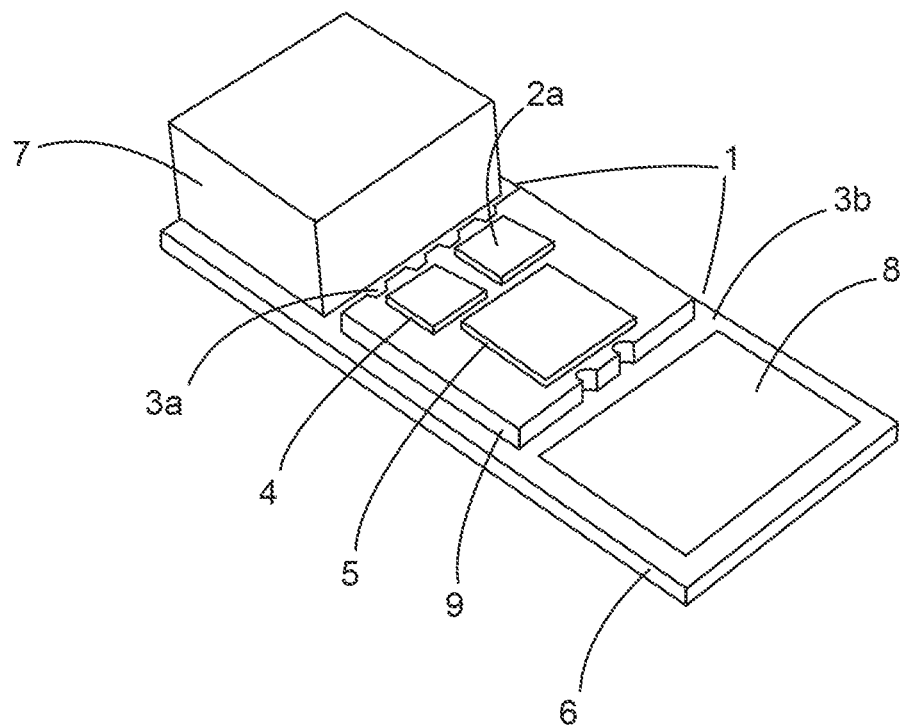
FIG. 2 shows a schematic perspective view of the use of an Internet-of-Things module according to a second exemplary embodiment.

FIG. 2 shows a schematic perspective view of an Internet-of-Things module according to a second exemplary embodiment. The Internet-of-Things module 1 has a first interface 3*a*, a voltage regulator 4, a controller 5, and a second interface 3*b*. Via the first interface 3*a*, the module is coupled to a plug connector 7 via which a hybrid single pair Ethernet cable can be connected. This first interface 3*a* then provides IP-based communication of data and commands as well as a power supply. The module 1 can be coupled to a sensor and/or actuator via the second interface 3*b*. Optionally, an adapter unit 8 can be provided between the second interface 3*b* and the sensor and/or actuator. The module 1 and optionally the adapter unit 8 can be provided on a carrier circuit board 6.

The voltage regulator 4 is used to convert the voltage received via the single pair Ethernet cable into a voltage required by the module 1 and optionally by the adapter electronics unit 8 or the sensor and/or actuator.

The Internet-of-Things module 1 can also be optionally provided on a carrier circuit board 6 and has an optional component carrier 9. The module 1 has a first connection or a first interface 3*a* via which the module can be coupled to a hybrid line, for example in the form of a single pair Ethernet cable. Both data and energy can be transmitted via this cable. The module 1 has a voltage regulator 4 for converting the voltage applied at the first connection 2 into a voltage required for the module 1 and optionally for a sensor/actuator that can be connected to the module. The module 1 also has a controller 5 and a second interface 3*b*, by means of which the module 1 can be directly or indirectly coupled to a sensor and/or actuator. Data and/or commands can be exchanged with the sensor/actuator via the second interface. The second interface also serves to provide a voltage supply to the sensor/actuator.

The module 1 has a PHY unit 2*a*. This PHY unit 2*a* is used for encoding and decoding data which is transmitted to the module via the hybrid cable, or data that the module has to transmit via the hybrid line. Using the PHY unit 2*a*, digital access to a modulated channel can be used.

The PHY unit 2*a* is a component that performs the encoding/decoding of the T1 Ethernet signals (signals that are transmitted over the hybrid single pair Ethernet) and provides an Ethernet-specific media-independent interface on the host side. The PHY unit 2*a* converts the data from and to the microcontroller or switch, which is received or transmitted via the single pair Ethernet line.

For example, the controller 5 has a microcontroller, a memory 5*a*. The module 1 has a Medium Access Control unit 2*b*, which is connected to the PHY unit 2*a* via the Ethernet-specific Medium Independent Interface MII. The controller 5 is also used to execute the portion of the IP network stack located above the MAC layer. The module optionally has at least one secure element 5*c*, which allows a secret, unreadable private key to be used for communication. This enables encryption of Internet-of-Things communication between the module and a network as well as authentication of the module. Optionally, this secure element can provide additional mechanisms for secure communication and authentication, such as a signing function or a random number generator.

The module 1 can be provided mechanically on a carrier circuit board 6. The carrier circuit board 6 can also have a plug connector 7 to which a hybrid line is connected, for example, in the form of a single pair Ethernet line. Optionally, the carrier circuit board can have an adapter circuit 8. The adapter circuit 8 is used for communication with the device 15 coupled to the module (e.g., a sensor, actuator, a wireless client, or an input-output adapter). The adapter circuit can thus adapt data, signals and/or a voltage supply for the sensors.

The module 1 with the carrier circuit board 6 can be provided as a dedicated unit. Alternatively, the module can be implemented together with the carrier circuit board 6 as a system-in-package or system-on-chip.

Figure 3:
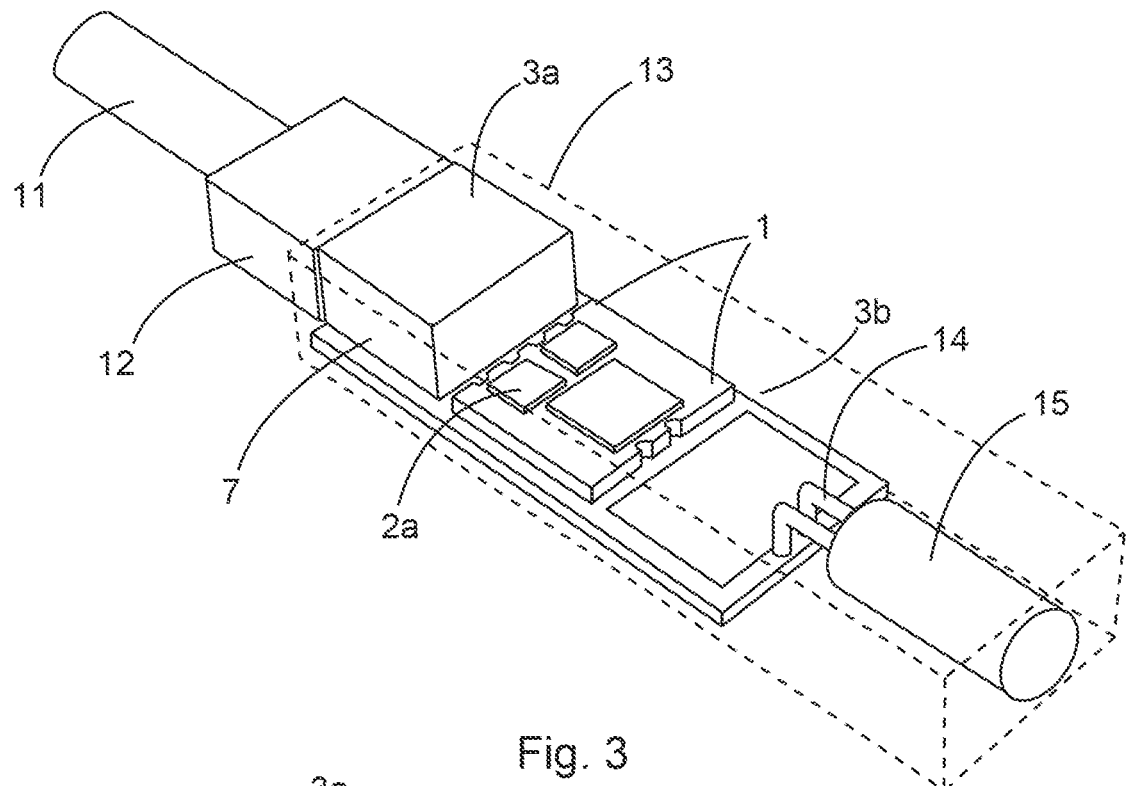
FIG. 3 shows a schematic perspective view of an Internet-of-Things module together with a sensor and a cable connected to the module.

FIG. 3 shows a schematic perspective view of an Internet-of-Things module together with a sensor and a cable connected to the module. FIG. 3 shows the module 1 in a sensor housing 13. The module 1 is coupled to a plug connector 7 to which in turn a hybrid cable (hybrid single pair Ethernet line) 11, 12 is coupled. A device 15 (for example, a sensor or a sensor/actuator, is coupled to the carrier circuit board 6. This means that all components (module 1, carrier circuit board 6, sensor 15, plug connector 7) are integrated in the sensor housing 13. The resulting component thus represents an Internet-of-Things sensor which can communicate with a network based on an IP protocol and a single pair Ethernet cable, for example. Sensor cables 14 are provided between the sensor 15 and the carrier circuit board 6. The exemplary embodiment of FIG. 3 is advantageous in particular with regard to optimizing the installation space, because this can reduce the installation space. Furthermore, the sensor shown in FIG. 3 is advantageous if the sensor is manufactured in large quantities.

Figure 4:
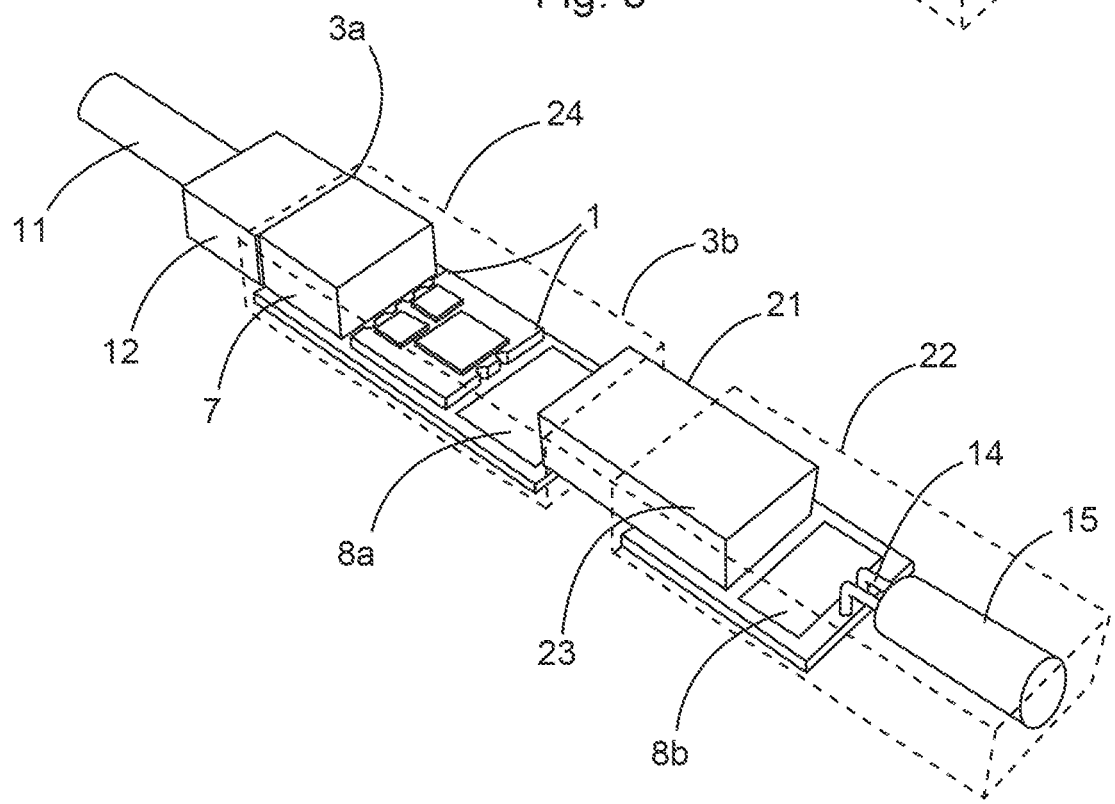
FIG. 4 shows a schematic view of an Internet-of-Things module, an adapter, and a sensor.

FIG. 4 shows a schematic view of an Internet-of-Things module, an adapter, and a sensor. In FIG. 4, in addition to the module 1 and the plug connector 7 as well as the carrier circuit board 6, an adapter 24 is provided between the module and the sensor. The module 1 can also be provided as part of an adapter 24 which is provided between the sensor and the hybrid cable and thus acts as an interface between the hybrid cable (hybrid single pair Ethernet line) and the sensor. The adapter 24 can enable data conversion and voltage conversion. The exemplary embodiment shown in FIG. 4 is advantageous if a plurality of sensors are to be used in different ways. While only one adapter circuit 8 is provided in the exemplary embodiment of FIGS. 2 and 3, in FIG. 4 this adapter circuit is divided into two parts, namely a first part 8a, which is part of the adapter, and a second part 8b, which is part of the sensor. A plug connection 21, 23 between adapter 24 and sensor can be provided for connecting the sensor to the adapter 24.

Figure 5B:
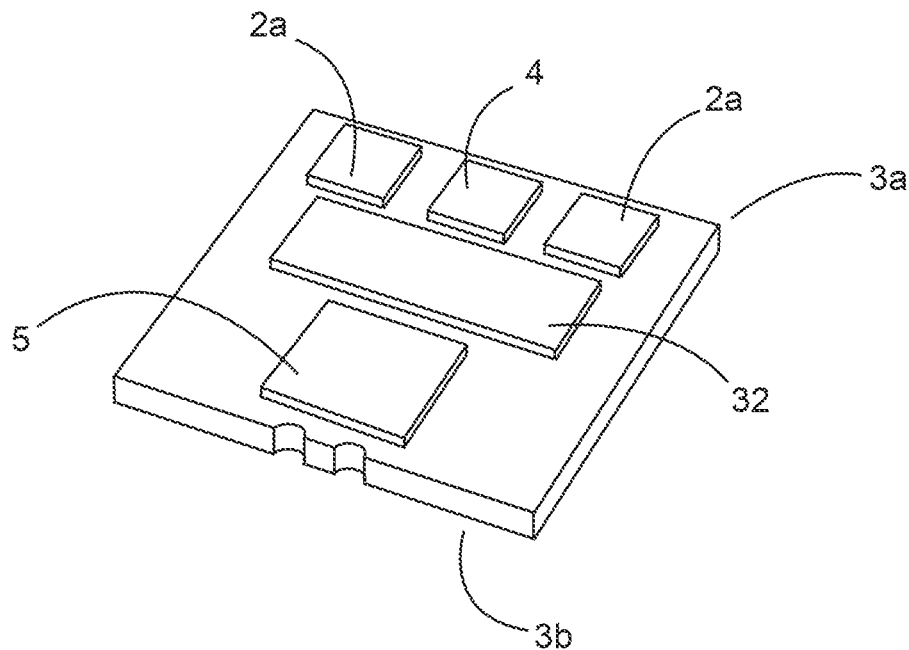
FIG. 5*b* shows a schematic view of an Internet-of-Things module according to a third exemplary embodiment.
Figure 5A:
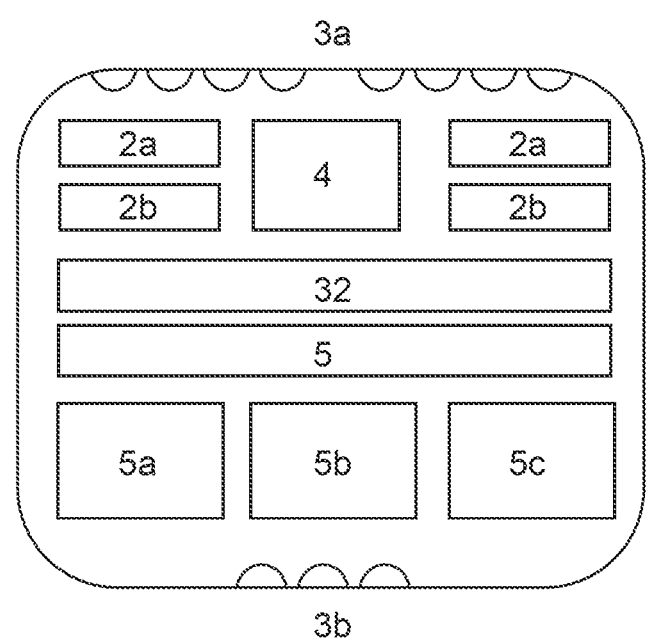
FIG. 5*a* shows a schematic block diagram of an Internet-of-Things module according to a third exemplary embodiment of the invention.

FIG. 5a shows a schematic block diagram of an Internet-of-Things module according to a third exemplary embodiment of the invention. The IoT module 1 has a first interface 3a and a second interface 3b. The module 1 can be coupled to the hybrid single pair Ethernet SPE line via the first interface 3a. Via the second interface 3b, the module 1 can be coupled to a device, e.g., a sensor, actuator, a wireless client, or an input-output module. The module 1 can comprise a voltage regulator 4 (DC/DC converter), a controller 5, at least two PHY units 2a, at least two MAC units 2b, a switching unit 32 (Ethernet switch, switch fabric), a memory 5a, a peripheral unit 5b, and a secure element 5c. The voltage regulator 4 is used to convert the DC voltage applied at the first interface into a voltage required for the operation of the module 1.

The difference relative to FIG. 1 is that multiple PHY units 5a and multiple MAC units 5b are present. A hybrid single pair Ethernet line can be connected to each of the PHY units 5a.

FIG. 5b shows a schematic view of an Internet-of-Things module according to a third exemplary embodiment. In addition to a controller 5, the module 1 has a voltage regulator 4, two PHY units 2a and an Ethernet switch 32. The Ethernet switch 32 is coupled to both the microcontroller 5 and the two PHY units 2a. This is accomplished in particular via a medium independent Interface MII. The module 1 according to the second exemplary embodiment of FIG. 5b can therefore be connected to two different hybrid lines.

By using at least two PHY units 2a, the network architecture of the IoT sensors/actuators no longer needs to be in a star configuration, but can be implemented as a line. Multiple PHY units can be connected in sequence in a line topology and enable IP-based communication. This results in only small current conversion losses, as the current can be looped through each module as a result of the hybrid cabling.

Figure 6:
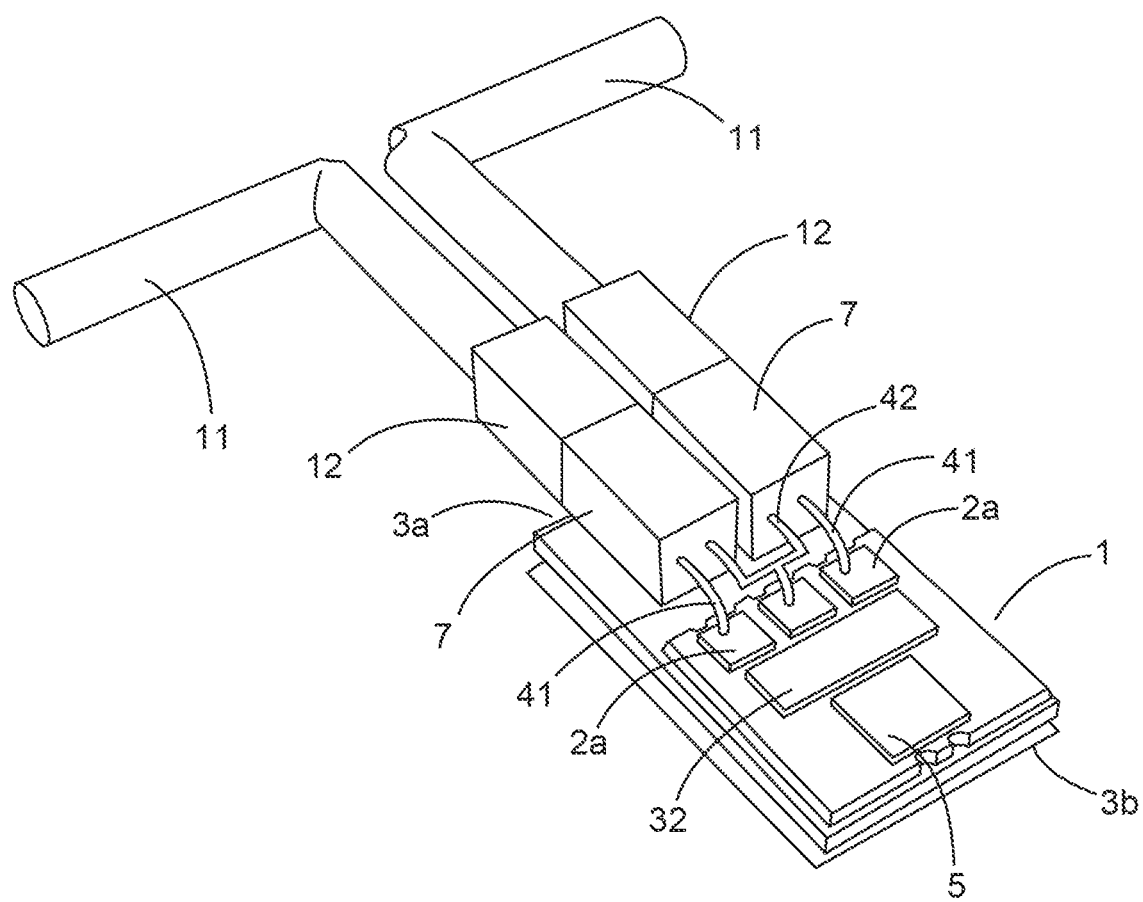
FIG. 6 shows a schematic view of an Internet-of-Things module according to a fourth exemplary embodiment.

FIG. 6 shows a schematic view of an Internet-of-Things module according to a fourth exemplary embodiment. FIG. 6 shows a module according to a third exemplary embodiment which is based on the second exemplary embodiment of FIG. 3. As in FIG. 3, the module has a controller 5, an optional Ethernet switch 32, a voltage regulator 4, and two PHY units 2a. In addition, two plug connectors 7 are coupled to the PHY units 2. A hybrid cable 11, 12 is connected to each of the two plug connectors 7. For example, the hybrid cable 11, 12 can be a single pair Ethernet line.

In addition, a data line 41 is provided at the output of each of the two connectors 7. In addition, voltage supply lines 42 are provided which are coupled to the voltage regulator 4. This is advantageous because it allows a concatenation (daisy chaining) of Internet-of-Things modules. For example, the voltage supply for the module can be configured as a bus. The voltage supply in the form of a bus is advantageous because the power for the next element does not need to be routed via a transformer, which would potentially have a negative effect on the data signals and is prone to losses.

According to one aspect of the present invention, twin-pair bus cabling systems (KNX; RS485) can therefore be used without the need for re-wiring.

An Internet-of-Things module is therefore provided which can couple sensors to a network and allows IP-based communication. The Internet-of-Things module has a component carrier 9, a PHY unit 2a, a voltage regulator 4, and a controller 5. Optionally, the module 1 has a secure element 5c and a memory 5a. The Internet-of-Things module has an interface, via which sensors and/or actuators can be coupled to the module. The controller 5 is suitable for enabling IP-based communication.

Optionally, the module 1 can have at least a plurality of PHY units 2a. The module can also have an Ethernet switch which can connect the PHY units and the controller 5.

According to another aspect of the present invention, a device, e.g., a sensor, actuator, a wireless client or an input-output adapter, is provided which has an Internet-of-Things module (as described above). The adapter can have a housing, a network-side plug connector, a sensor-side plug connector, a carrier circuit board, and optionally an adapter circuit for the sensor/actuator.

The controller is able to execute codes to enable IPv6-based communication.

According to another aspect of the present invention, the Internet-of-Things module is provided in an integrated component.

According to another aspect of the present invention, an n-port T1 hybrid switch with an Internet-of-Things module can be provided. The switch can be installed in cable harnesses.

According to another aspect of the present invention, a media converter with an Internet-of-Things module is provided, which has an additional PHY unit and an Ethernet switch. The media converter can be integrated into cable harnesses.

According to one aspect of the present invention, the device that can be connected to the second interface 3b is designed as a wireless transmitter/receiver or a wireless client. In particular, the device can be provided as a wireless client bridge, for example with integrated antenna and corresponding electronics. The wireless client can thus be connected to a network via the IoT module and a hybrid single pair Ethernet line. The Wi-Fi client bridge can then enable wireless communication via a corresponding wireless protocol. For example, the wireless communication can be based on a WiFi protocol (ac or ax) at 2.4 GHz and/or 5 GHz. The wireless client can be supplied with 12 or 24 volts via the hybrid single pair Ethernet line. The Ethernet communication can be based on a 100 Base T1 standard. In particular, a single pair hybrid connector (for example male) can be provided to contact the wireless client.

For example, the wireless client can have a housing with IP67. Optionally, the maximum length is 12 cm and the maximum diameter is 3 cm. An operating temperature range can extend from −25° C. to 85° C.

The wireless client can be configured as a WiFi bridge mode client. The wireless client can securely connect to Small Office Home Office router SOHO. An Enterprise Security can be provided as an alternative or in addition.

Optionally, the wireless client can allow communication from/into the IPv6-only segment via IPv4 networks. An IPv4 client proxy can also be provided. This can display all IPv6 link local nodes and allow access to these nodes via dedicated ports. A device provisional protocol DPP can also be implemented.

The wireless client is designed neither as an AP router nor as a DHCP server.

According to another aspect of the present invention, the device that can be connected to the second interface 3b is a wireless client that allows mobile radio communication, for example LTE communication or 5G communication. For this purpose, the wireless client can have a housing which optionally has a slot for a SIM card. Alternatively, an electronic SIM can also be used. Optionally, the wireless client can have a VPN (virtual private network) client to allow it to establish a secure communication. The wireless client based on a mobile radio standard can thus carry out wireless mobile communication and exchange the data and commands with a connected network via the IoT module and the hybrid single pair Ethernet line.

Optionally, the mobile radio-based wireless client does not have a display, but can be controlled or settings can be changed via a web-based user interface.

According to one aspect of the present invention, the device that can be connected to the second interface 3b can be an adapter for IO-link sensors. In particular, this adapter is used to enable digital sensors or actuators which do not have an IP-enabled interface to connect to a network via the adapter and the IoT module in order to be able to carry out IP-based communication.

The invention claimed is:

1. An Internet-of-Things module for a device, the Internet-of-Things module comprising:
   a first interface configured to couple the Internet-of-Things module to a hybrid single pair Ethernet line for exchanging data and/or commands and for supplying voltage,
   a voltage regulator for converting the first voltage applied at the first interface into a second voltage for supplying the Internet-of-Things module,
   a controller for IP-based communication via the hybrid single pair Ethernet line which is configured to be coupled to the first interface,
   a second interface configured to couple the Internet-of-Things module to the device for exchanging data, signals, and/or commands and for supplying voltage, wherein the second interface is releasably and interchangeably pluggable to a plurality of devices including the device and switchable between the plurality of devices, and the Internet-of-Things module is interoperable with the plurality of devices, wherein the Internet-of-Things module and the device are separate devices, and
   a carrier circuit board,
   wherein the first and second interfaces, the voltage regulator, and the controller are coupled to the carrier circuit board,
   wherein the Internet-of-Things module is implemented as a system-in-package or a system-on-chip,
   wherein the device has no keyboard, display, or other human-machine interface for configuration by a user, and
   wherein parameters of the device can be configured via the second interface, the Internet-of-Things module, the first interface, and an external web-based user interface.

2. The Internet-of-Things module according to claim 1, wherein the device has at least one of a sensor, an actuator, a wireless transmitter/receiver, or an input/output adapter.

3. The Internet-of-Things module according to claim 1, comprising at least one PHY unit for encoding or decoding the signals that are transmitted via the hybrid single pair Ethernet line.

4. The Internet-of-Things module according to claim 1, comprising an Ethernet switch and at least two PHY units, which allow a connection of a plurality of hybrid cables.

5. The Internet-of-Things module according to claim 1, comprising a secure element for encryption and decryption of the IP-based communication via the at least one hybrid single pair Ethernet line.

6. The Internet-of-Things module according to claim 1, wherein the controller is designed to allow a purely IPV6-based communication.

7. The Internet-of-Things module according to claim 1, wherein the device is a sensor.

8. The Internet-of-Things module according to claim 1, wherein the device is a switch.

9. The Internet-of-Things module according to claim 1, wherein the device is a media converter.

10. The Internet-of-Things module according to claim 1, wherein the device is a wireless transmitter/receiver.

11. The Internet-of-Things module according to claim 1, wherein the device is an actuator.

12. The Internet-of-Things module device-according to claim 1, comprising:
 a housing integrating:
  the first interface,
  the voltage regulator,
  the controller, and
  the second interface.

\* \* \* \* \*

UNITED STATES PATENT AND TRADEMARK OFFICE
CERTIFICATE OF CORRECTION

| | | |
|---|---|---|
| PATENT NO. | : 12,348,331 B2 | Page 1 of 1 |
| APPLICATION NO. | : 17/765324 | |
| DATED | : July 1, 2025 | |
| INVENTOR(S) | : Karsten Walther | |

It is certified that error appears in the above-identified patent and that said Letters Patent is hereby corrected as shown below:

In the Claims

Column 8, Claim 6, Line 56:
"IPV6-"
Should read:
-- IPv6- --.

Column 9, Claim 12, Line 1:
"module device-according"
Should read:
-- module according --.

Signed and Sealed this
Ninth Day of September, 2025

Coke Morgan Stewart
*Acting Director of the United States Patent and Trademark Office*